United States Patent [19]

Pagallo

[11] Patent Number: 5,317,647
[45] Date of Patent: May 31, 1994

[54] CONSTRAINED ATTRIBUTE GRAMMARS FOR SYNTACTIC PATTERN RECOGNITION

[75] Inventor: Giulia Pagallo, Cupertino, Calif.

[73] Assignee: Apple Computer, Inc., Cupertino, Calif.

[21] Appl. No.: 864,607

[22] Filed: Apr. 7, 1992

[51] Int. Cl.[5] ............................................. G06K 9/62
[52] U.S. Cl. ......................................... 382/14; 382/9; 382/30; 395/12; 395/63
[58] Field of Search .................... 382/14, 15, 9, 30, 10, 382/34; 395/12, 63, 21

[56] References Cited

U.S. PATENT DOCUMENTS

4,688,195  8/1987  Thompson et al. .................... 395/12
5,083,268  1/1992  Hemphill et al. ...................... 395/12

OTHER PUBLICATIONS

Wen-Hsiang Tsai and King-Sun Fu, "Attributed Grammar-A Tool for Combining Syntactic and Statistical Approaches to Pattern Recognition, " IEEE Transactions On Systems, Man, and Cybernetics, vol. SMC-10, No. 12, pp. 873-885 (Dec. 1980).

R. H. Anderson, "Syntax-Directed Recognition of Hand-Printed Two-Deminsional Mathematics," Interactive Systems for Experimental Applied Mathmetics, M. Klerer and J. Reinfelds, pp. 436-459 New York, Academic Press, 1981.

A. Belaid and Jean-Paul Haton, "A Syntactic Approach for Handwritten Mathematical Formula Recognition," IEEE Transactions On Pattern Analysis and Machine Intelligence, vol. PAMI-6, No. 1, pp. 105-111 (Jan. 1984).

R. Helm, K. Marriott, and M. Odersky, "Building Visual Language Parsers," published in the confernce proceeding of the CHI '91 conference, held Apr. 27–May 2, 1991, pp. 105-112.

*Primary Examiner*—Joseph Mancuso
*Attorney, Agent, or Firm*—Blakely, Sokoloff, Taylor & Zafman

[57] ABSTRACT

A method for defining and identifying valid patterns for used in a pattern recognition system. The method is particularly well suited for defining and recognizing patterns comprised of subpatterns which have multidimensional relationships. The definition portion is embodied in a constrained attribute grammar. The constrained attribute grammar includes nonterminal, keyword and non-keyword symbols, attribute definitions corresponding to each symbol, a set of production rules, and a relevance measure for each of the key symbols. Each of the symbols represents a subpattern. The production rules includes syntactic, semantic, constraints and action portions. It is the production rules which define the dimensional relationships between the various subpatterns. An instantiation of a constrained attribute grammar is called a language. The verification portion is comprised of a parsing scheme that determines validity of a pattern. The verification portion receives a set of input subpatterns provided by a character recognition system and a provided language. When a valid pattern is recognized, a representation of the pattern in a form suitable for use by a data manipulation means is provides as output.

4 Claims, 8 Drawing Sheets

CONSTRAINED ATTRIBUTE GRAMMARS FOR SYNTACTIC PATTERN RECOGNITION

BACKGROUND OF THE INVENTION

1. Field of the Invention

The present invention relates to the field of pattern recognition, in particular to the recognition of a provided pattern as a valid pattern in a predefined language.

2. Description of the Related Art

Pattern recognition is a field where patterns, typically a visual expression such as a mathematical expression, or a flow diagram, or an organization chart are identified as valid. Typically, an image of a pattern will be provided by optically scanning a medium to create a bit mapped image of the medium. Once the bit mapped image is created, individual symbols or characters are identified through a process known as character recognition. Such character recognition techniques include matching of a bit mapped representation of the character with templates of known characters, analysis of polygon representations of the character and statistical analysis of the bit mapped representation of the character.

Pattern recognition is an important component for an emerging technology for computer systems known as pen based systems (or notepad computers). In a pen based system, a user inputs data to the computer by "writing" onto an input pad. This is contrasted with traditional methods of entering data on a keyboard or moving a cursor on a display to invoke some action. As the data being input may be anything written onto the input pad, for any particular application it must be determined that the data being input is of the proper type and syntax appropriate for the particular application.

It is known that the symbols or characters comprising a class of patterns (language) have relationships that can be defined in terms of a grammar (also known as syntactic methods). A grammar is a set of syntactic rules and symbols which define a language (or domain). Different grammars may have different types of rules and/or symbols. The language may be a spoken language, e.g. English or French, or it could be a computer language, e.g. Fortran or PASCAL. The syntactic rules define a method by which an expression may be identified as a valid or invalid expression in a language. In Computer Science, grammars have also been used to describe the logic of computing. Basic courses in automata theory use grammars to define finite and non-finite computing models.

With respect to pattern recognition, it is desirable to use syntactic methods when it is convenient to represent a pattern as a collection of one or more subpatterns. A subpattern is defined as a symbol or a group of related symbols. For a written language a symbol may be a letter of an alphabet or a mathematical operator or a graphical symbol. Syntactic methods are also desirable when the validity of a pattern depends on the relationships of its subpatterns. For example, for recognizing the validity of a mathematical equation, it may not be valid to have two mathematical operators being adjacent, even through on their own, each operator is a valid symbol in the grammar.

While a grammar defines the valid symbols and syntactic rules, a particular pattern is analyzed using a parsing process. Conventional methods of parsing are linear, i.e. top-down or bottom-up. A parsing process will determine whether a pattern is valid or invalid. The parsing process will determine validity via a lexical analysis (i.e. checking the validity of the individual subpatterns) and by determining that the syntactic rules are followed. If the pattern is valid, the parsing process will return a parsed representation of the pattern according to the syntactic rules. If the pattern is invalid, the parsing processing may terminate and provide information as to why the pattern is invalid.

As noted above, in the art of pattern recognition, syntactic methods have been utilized. One such syntactic method is known as an attribute grammar. Attribute grammars are discussed in an article entitled "Attributed Grammar—A Tool for Combining Syntactic and Statistical Approaches to Pattern Recognition", Wen-Hsiang Tsai and King-Su Fu, published in *IEEE Transactions on Systems, Man, and Cybernetics*, pgs. 873–885, Vol. SMC-10, No. 12, December 1980. In an attribute grammar, semantic information of the patterns is combined with the syntactic rules to create a production rule. The syntactic rules establish a relationship among subpatterns. The semantic information is used to compute attributes of a pattern using the attributes of the related subpatterns. The attributes of a related subpattern may also be used to indicate the applicability of a production rule.

An attribute grammar is defined as a five tuple $$G = (V_T, V_N, A, P, S)$$

where $V_T$ is a set of terminal symbols, $V_N$ is a set of nonterminal symbols, A is a set of attributes, P is a set of production rules, and S is the start symbol. A symbol is merely a representation of a pattern or subpattern within the grammar. A terminal symbol represents subpatterns that cannot be further divided (e.g. a letter in an alphabet), whereas a nonterminal symbol represents a subpattern that may be further divided. For each $X \in V_T \cup V_N$, the expression A(x) denotes the attribute values of x, although some of the attribute values may be undefined for a given symbol. Each production rule in P has two parts, the first part of the rule specifies a syntactic restriction among the symbols and the second part of the rule specifies a semantic restriction among the symbols. The syntactic part is of context-free form. The semantic part describes how the attribute values of the left-hand side symbol of the syntactic rule are computed in terms of the attribute values of the symbols on the right-hand-side. Alternatively, the semantic part can indicate under which conditions the syntactic rule applies. Formally, the syntactic part of a rule is:

$$B \rightarrow B_1 B_2 \ldots B_n$$

where $$B_i \in V_N \cup V_T, \text{ for } 1 \leq i \leq n.$$

The semantic part of the rule is a set of mappings. There are as many mappings as the number of attributes for the nonterminal B. Each mapping computes the corresponding attribute value of B from the attribute values of $B_1 B_2 \ldots B_n$.

Known attribute grammars are limited to defining one-dimensional relationships between subpatterns. It has been recognized that for some applications it is desirable to define multi-dimensional relationships between the subpatterns. This may occur for example in the analysis of mathematical expressions or fractions. In a fraction, one integer value is above a fraction line while a second integer value is below the fraction line. The same can be true for sub-expressions of a mathematical expression. Here, the relationships between the symbols are both horizontal and vertical (i.e. two-dimensional).

A method for describing and analyzing patterns with 2-D relationships is described in a paper entitled "Syntax-Directed Recognition of Hand-Printed Two-Dimensional Mathematics", Robert H. Anderson, *Interactive Systems for Experimental Applied Mathematics,* pgs. 436-459, New York, Academic Press, 1981. The Anderson paper describes syntax rules for driving a parsing process. The syntax rules have corresponding conditions for positively identifying particular input. However, the method described requires extensive computing resources to perform a pattern recognition analysis. This is because the associated parsing requires the examination of an overly broad set of permutations of the subpatterns which comprise the pattern. In particular, the described method does not provide for the use of keywords or heuristic information within the parsing process.

Therefore, it is an object of the present invention to provide a pattern recognition method where patterns having multi-dimensional relationships are defined and recognized with accuracy and computational efficiency.

SUMMARY

A method for defining and identifying valid patterns is a pattern recognition system, is disclosed. The method is particularly well suited for defining and recognizing patterns comprised of subpatterns which have multi-dimensional relationships. The pattern recognition system is typically embodied in a larger functional system which includes a character recognition system and a data manipulation system.

The present invention is generally divided into two portions; a language definition portion and a verification portion. The language definition portion is embodied by a constrained attribute grammar. The constrained attribute grammar includes sets of nonterminal, keyword and non-keyword symbols, attribute definitions corresponding to each symbol, a set of production rules, and a relevance measure for each of the keyword symbols. The production rules includes syntactic, semantic, constraints and action portions. The syntactic portion defines a production relation between symbols. The semantic portions defines a relationship based on the attributes of symbols. The constrains portions include definition for multi-dimensional relationships between symbols. The action portion defines the action that is performed if the rule matches. The verification portion is comprised of a parsing scheme that takes a set of input subpatterns provided by a character recognition system and determines whether the input subpatterns define a valid pattern according to a language implementation of the grammar. The output of the verification portion is a tree structured representation of the pattern.

The parsing method of the preferred embodiment includes the steps of providing an instance of a constrained attribute grammar, a set of input subpatterns and the grammar start symbol to a parsing means, parsing the set of input subpatterns to determine if the set of input subpatterns can be rewritten as the start symbol according to the set of production rules; if the set of input subpatterns can be written as the start symbol according to the set of production rules, returning a parsed representation of the set of input subpatterns; and if the set of input subpatterns cannot be rewritten as the start symbol according to the set of production rules, returning information as to why the set of input subpatterns is invalid.

DETAILED DESCRIPTION OF THE PREFERRED EMBODIMENT

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

A method for defining and identifying valid patterns in a pattern recognition system is described. In the following description, numerous specific details are set forth such as the specific spatial relationships for well known mathematic functions, in order to provide a thorough understanding of the present invention. It will be apparent, however, to one skilled in the art that the present invention may be practiced without these specific details. In other instances, specific character recognition or data manipulation techniques have not been shown in detail in order not to unnecessarily obscure the present invention.

Overview of a Computer System in the Preferred Embodiment

Figure 1A:
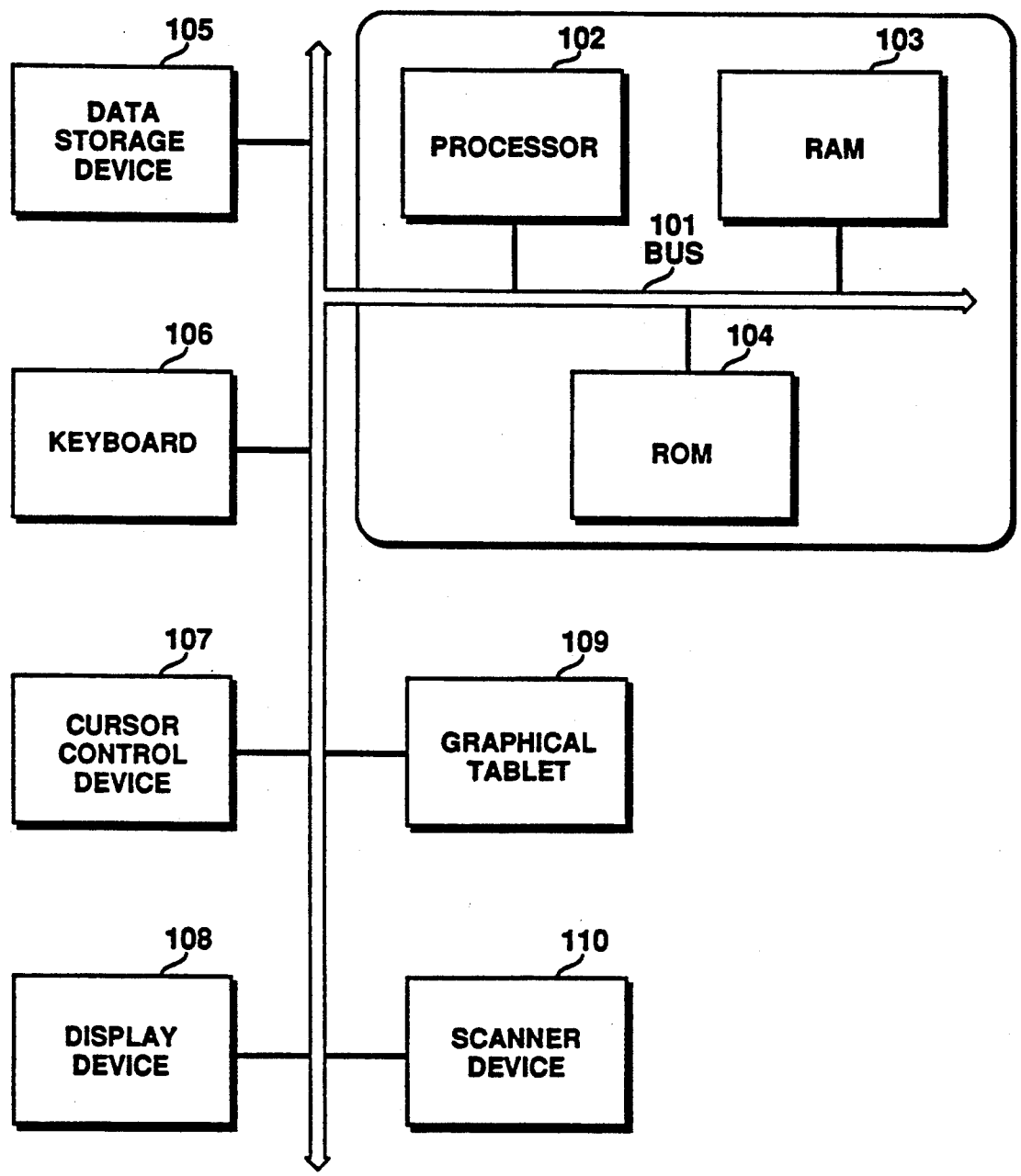
FIG. 1a illustrates a computer system as may embody the preferred embodiment of the present invention.

The preferred embodiment of the present invention may be practiced on computer systems having alternative configurations. FIG. 1a illustrates some of the basic components of such a computer system, but is not meant to exclude other components or to imply that such components are discrete. It is known that some components, most notably a display device, may perform both input and output functions (as found in pen based systems). In any event, the computer system illustrated in FIG. 1a comprises a bus or other communication means 101 for communicating information, a processing means 102 coupled with the bus 101 for processing information, a random access memory (RAM) or other storage device 103 (commonly referred to as a main memory) coupled with the bus 101 for storing information and instructions for the processor 102, a read only memory (ROM) or other static storage device 104 coupled with the bus 101 for storing static information and instructions for the processor 102.

Other devices coupled to the bus 101 include a data storage device 105, such as a magnetic disk drive for storing information and instructions, an alphanumeric input device 106 including alphanumeric and other keys for communicating information and command selections to the processor 102, a cursor control device 107, such as a mouse, track-ball, cursor control keys, etc, for controlling a cursor and communicating information and command selections to the processor 102, a display device 108 for displaying data input and output and a graphical tablet 109 for communicating information to the processor 102 by inscription.

A scanner 110 may also be coupled to the computer system through bus 101. The scanner 110 would provide bit-mapped representations of documents as input to operating software, e.g. character recognition software, executing on the computer system.

At this point in order to avoid subsequent confusion, it is instructive to distinguish the present invention from a use of the present invention. A particular language is said to be an instance of a grammar. Thus, in the following description, the class of constrained attribute grammars and the parsing scheme represent the preferred embodiment, whereas the exemplary mathematical expression language represents an instance of the preferred embodiment.

Description of Commonly Used Terms

Figure 2:
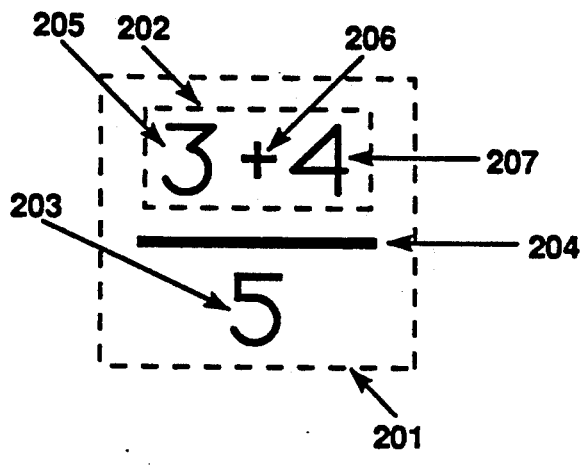
FIG. 2 illustrates the spatial relationships between the symbols in a mathematical expression as may be recognized by the preferred embodiment of the present invention.

At this point it would be useful to define some terms that will be used throughout this description. A pattern denotes the object to be recognized as valid or invalid. A pattern is typically comprised of one or more subpatterns. A subpattern corresponds to an individual character or a set of related characters. Referring briefly to FIG. 2, the mathematical expression $$\frac{3+4}{5}$$

201 is a pattern, while the subexpressions "3+4" 202, the division symbol 204 and the number "5" 203 are subpatterns. Further, each of the individual characters "3" 205, "+" 206 and "4" 207 would also represent subpatterns.

In the foregoing definitions, the references will be to visual language recognition systems. However, such definitions are not meant to limit the scope of the present invention. It would be apparent to one skilled in the art that the concepts described are extensible to other areas while syntactic methods may be used.

The types of symbols as used in the description of a constrained attribute grammar are now discussed. A symbol is merely a representation within the grammar, of a pattern or a subpattern. There are four basic types of symbols: keyword, non-keyword, terminal and non-terminal symbols. A keyword symbol holds a special significance in parsing. A keyword symbol provides a local starting point for a parsing process. For example, with respect to FIG. 2, the division symbol 204 is a keyword. Next, a non-keyword symbol represents a character that is not a keyword. For example, with respect to FIG. 2, the "3" and "4" are represented by non-keyword symbols. Collectively, the set of keyword and non-keyword symbols are called terminal symbols. Nonterminal symbols represent subpatterns that are not terminal symbols. For example, the sub-expression "3+4" 202 would be represented by a nonterminal symbol.

Overview of a Pattern Recognition System in the Preferred Embodiment

A pattern recognition system in the preferred embodiment is generally a functional component in a recognition system. Such a recognition system may be used for recognizing visual languages, e.g. organizational charts or mathematical expressions or written music scores. Input for the pattern recognition system would come from a character recognition system or a similar system that may provide a set of terminal symbol level subpatterns. The output of the pattern recognition system would be to a data manipulation system. For example, a pattern recognition system may be embodied within a calculating system where a user "writes" the mathematical equation that is to be performed on a graphical tablet. The character recognition system would separate and identify the individual "written" characters and symbols. The pattern recognition system will determine if the "written" characters are syntactically valid, i.e. that they construct a valid expression. Finally, the data manipulation system would perform the mathematical calculation.

Figure 1B:
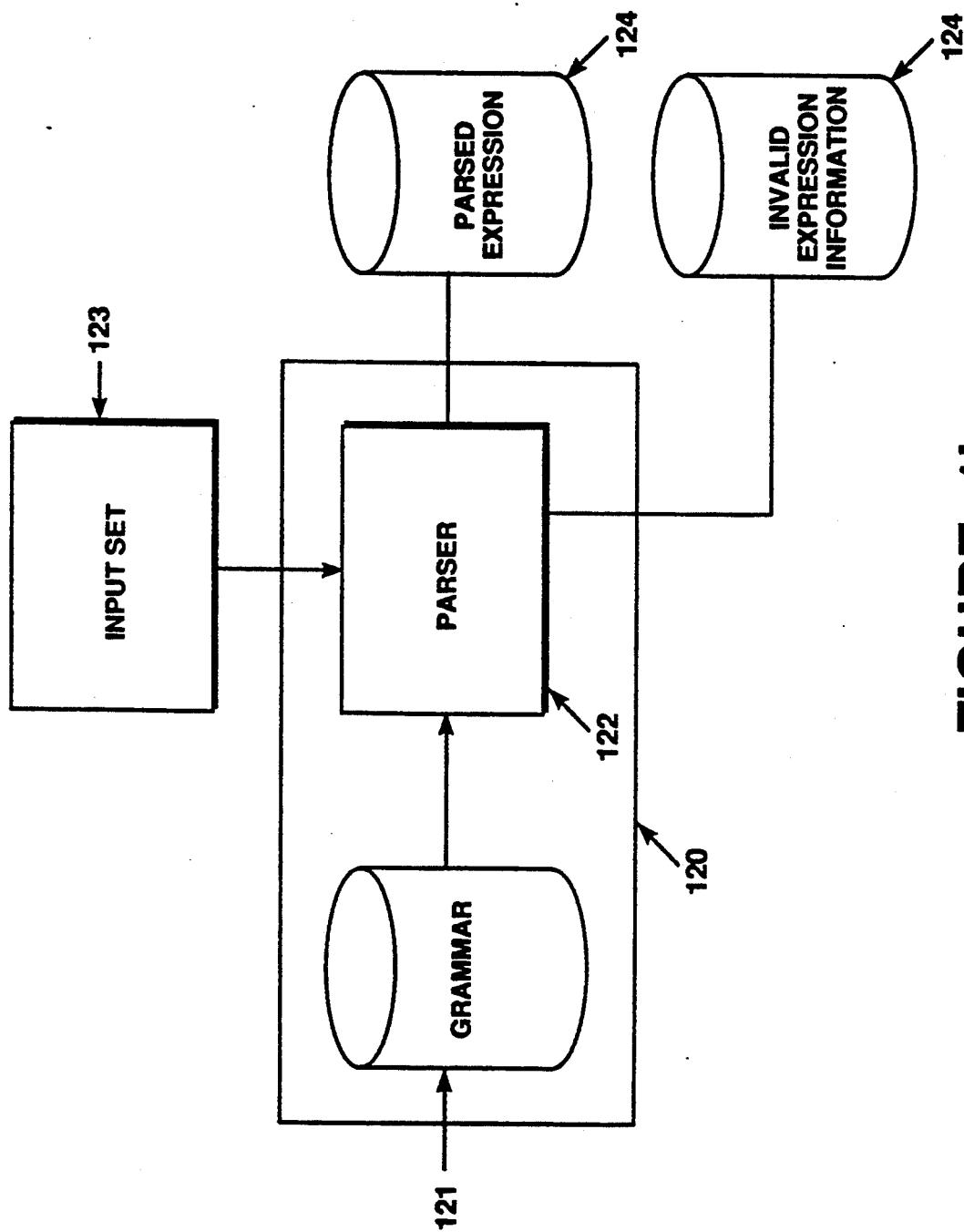
FIG. 1b illustrates an overview of a pattern recognition system of the preferred embodiment of the present invention.

FIG. 1b illustrates the pattern recognition system of the preferred embodiment. The pattern recognition system is comprised of a language definition portion and pattern verification portion. The basis of the pattern recognition system is embodied in the grammar 121 (language definition portion) and parser 122 (pattern verification portion), which are bounded by rectangle 120. The input set 123 is provided by a character recognition system. As will be discussed in more detail below, the input set 123 consists of subpatterns that comprise the pattern being recognized. Parsed expression 124 or invalid expression information is provided as output of Parser 122. Each of these function is now described in more detail.

Grammar 121

The pattern of recognition system of the preferred embodiment provides for the instantiation of a language using the framework of constrained attribute grammars. Briefly, the class of constrained attribute grammars adds dimensional constraints to the framework of attribute grammars (previously described with respect to the prior art). Such dimensional constraints allows for implementation of languages which have subpatterns with multi-dimensional relationships. The class of constrained attribute grammars is described in more detail below.

The function of a grammar in pattern recognition is exemplified in the analysis of simple mathematical expressions. Using standard English notation, the expansion "3+5" is valid. However, the same characters can be rearranged to create and expression for example, "3 5+", which is invalid. Moreover, in a polish notation the expression "+3 5" is valid while the expression "3+5" is invalid. In this example, if the selected grammar was for English notation, an expression with the key symbol "+" is only valid when it has numbers on both sides.

Parser 122

The verification portion of the pattern recognition system is defined in terms of a Parser. A Parser interprets patterns according to a particular grammar. A Parser will apply the rules of the grammar to the pattern to determine if the dimensional and syntactic relationships defined by the grammar are in place. If the relationships are not in place, the pattern is determined to be invalid. If the relationships are in place, the Parser provides a tree-structured representation of the input pattern, that corresponds to the rules of the grammar. The tree-structured representation provides a logical organization of the data for the data manipulation system.

Multi-Dimensional Relationships

As noted above, the class of constrained attribute grammars of the preferred embodiment provides for defining patterns whose subpatterns have multi-dimensional relationships. Referring again to FIG. 2, a pattern whose subpatterns have a two dimensional (2-D) spatial relationship is illustrated. In FIG. 2, the mathematical expression $$\text{``} \frac{3+4}{5} \text{''}$$

201 is illustrated. The sub-expression 202, "3+4" is above a subpattern 204, here the division symbol. For this example, subpattern 204 is keyword. Thus, a subpattern 203, where the number "5" is below the keyword 204. One aspect of the spatial relationship for the pattern 201 is defined with respect to keyword 204 (although in the preferred embodiment, the spatial relationships are not limited to those involving a keyword). Here, for a valid pattern to exist a first subpattern must be above the keyword 204 and a second subpattern must be below the keyword 204. Thus, a valid vertical relationship between subpatterns must be established. A second aspect of the spatial relationships is found in the subpattern 202 "3+4" and 207 "4". In order for the subpattern 206 to define a valid pattern, a subpattern must be to the left of the keyword 206 and a subpattern must be to the right of keyword 206. Thus, a valid horizontal relationship between subpatterns must exist. Here, the subpatterns 202 and 203 satisfy the required vertical criteria and the subpatterns 205 and 207 satisfy the required criteria. The manner in which it is determined that such criteria is satisfied is described with respect to attributes of the subpattern.

Figure 3:
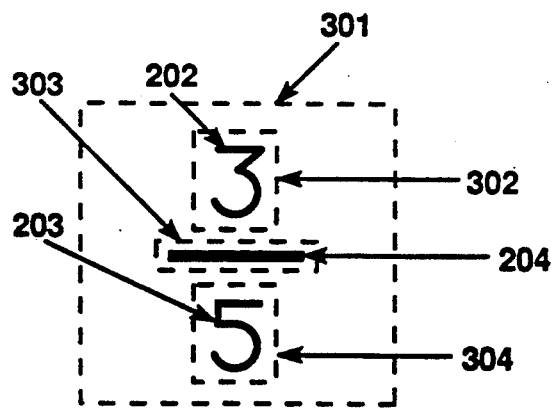
FIG. 3 illustrates boundary rectangles for the various symbols described in FIG. 2, as may be utilized by the preferred embodiment of the present invention.

As it will be described in more detail below each terminal and nonterminal symbol in a constrained attribute grammar has an associated list of attributes. These attributes relate to properties of a corresponding subpattern. For example, for an instance of a visual language, the attribute associated to a pattern may be a boundary rectangle. A boundary rectangle is created by projecting the pattern onto an X-Y coordinate system and determining the rectangle which bounds the pattern. FIG. 3 illustrates boundary rectangles of the subpattern in the pattern 201 of FIG. 2. It should be noted that the boundary rectangles as illustrated in FIG. 3 are not precise in that they are larger than would be actually defined. This is done for the purpose of illustration so that the different boundary rectangles could be clearly distinguished. For further clarity, it is assumed that the pattern 201 represents a nonterminal symbol. A boundary rectangle 301 for the nonterminal symbol encompasses the entire pattern. As will be described below with respect to a specific language implementation example, the boundary rectangle for a nonterminal symbol is merely the union of the boundary rectangles of the non-keywords and keywords that comprise the nonterminal. Further, boundary rectangles 302, 303 and 304 are illustrated and correspond to subpattern 202, keyword subpattern 204 and subpattern 203, respectively. Each of the boundary rectangles may be defined in terms of it's coordinate addresses. In order to determine whether specified spatial constraints are met, the boundary rectangles are compared. As illustrated in FIG. 3, the boundary rectangle 302 of the subpattern 202 is to the north of the boundary rectangle 303 for the keyword subpattern 204. Further, the boundary rectangle 304 of the subpattern 203 is to the south of the boundary rectangle 304 for the subpattern 203. Thus, the spatial constraints for a valid pattern including a division symbol, are met.

Definition of the Class of Constrained Attribute Grammars of the Preferred Embodiment A constrained attribute grammar differs from known grammars by adding dimensional constraints to a set of syntactic and semantic rules. A further distinction is a refinement in the classification of terminal symbols. A constrained attribute grammar is a seven-tuple $$G = (V_N, V_K, V_{NK}, A, P, S, M).$$

In the grammar, $V_N$ is a set of nonterminal symbols (nonterminals), $V_K$ is a set of keyword symbols (keywords) and $V_{NK}$ is a set of non-keyword symbols (non-keywords). It should further be noted that the combined set of keyword symbols $V_K$ and non-keyword symbols $V_{NK}$ (i.e. $V_T = V_K \cup V_{KN}$) is referred to as the set of terminal symbols $V_T$ (terminals). It should be noted that the terminal symbols will typically represent the initial input subpatterns to the parsing method of the preferred embodiment. The reason for the classification of terminal symbols into separate classes is described in more detail below.

A is a set of attributes so that for each $x \in \cup V_N$, A (x) denotes the attribute values of x. Attributes described a physical characteristic, e.g. the coordinates of a boundary rectangle enclosing a terminal symbol or a nonterminal symbol. It should be noted that some attributes may be undefined for a particular symbol.

P is a set of production rules. Production rules define the syntactic and semantic rules, the constraints that must exist between terminals and/or nonterminals in order to have a valid pattern, and the action that is taken when a rule matches. Production rules are discussed in more detail below. S is the start symbol. The start symbol S is a nonterminal symbol that is used to indicated the root node for a tree structure that will be generated during the parsing step. Finally, M is a mapping from the set of keywords into the real numbers. The mapping M will provide a weighting factor for the keyword symbols and will provide a processing order for a generated parse tree.

As described above, the set of keyword symbols $V_K$ combined with the set of non-keywords symbols $V_{NK}$ comprise the set of terminal symbols $V_T$. The set of terminal symbols $V_T$ is divided into keyword symbols and non-keyword symbols for several reasons. A first reason is that a keyword symbol may be conveniently used as a local starting point for parsing. Hence, a keyword symbol may be used as a handle for parsing a subset of the input. As described above, the relevance measure of keywords used in conjunction with constraints, provides a simple method for imposing an order in which to select the local starting input symbols. A second reason for the terminal symbol dichotomy is to make the representation of production rule constraints uniform. All constraints in a given rule may use the same keyword as a reference point. However, this could be easily generalized. The use of keywords in each production rule of a grammar is not required. However, the use of keywords for any of the reasons stated above may have the effect of simplifying the parsing process.

Referring back to the production rules as described above, each production rule in P consists of four parts: a syntactic part, a semantic part, a constraint part and an action part. The syntactic part of the rule has the form $B \rightarrow B_1 B_2 \ldots B_n$ wherein n is a positive integer, $B \epsilon V_N$ and $B_1 \epsilon V_N \cup V_T$ where $B_i \epsilon V_{NU} V_{NK}$, for $2 \leq i \leq n$.

From this definition it can be seen that a rule has at most one keyword associated with it. As it will become apparent, the requirement that each rule has at most one keyword and that such a keyword is listed as the first symbol on the right hand side aids parsing. However, this requirement is not a limitation because a rule that would require more than one keyword can be rewritten as a sequence of rules with at most one keyword, and because rule symbols can be written in any order through the use of constraints. The syntactic and semantic parts of a production rule have the same interpretation as they do in attribute grammars. The constraint part of a rule establishes a correspondence between input symbols and symbols on the right hand side of the syntactic rule. There is a constraint for each symbol on the right hand side of the syntactic part of a rule. However, there are instances in which a rule is satisfied solely if the syntactic part is satisfied (e.g. when a constraint is valid for any symbol). Each input symbol that satisfies the constraint for a rule symbol is in correspondence with that rule symbol. Constraints are frequently expressed in terms of attributes of the symbols. For instance, assume that the attributes of the symbols are the corner points of their bounding rectangles. A desired constraint for a nonterminal symbol in a rule may be to limit the input symbols associated with this rule symbol be to those to the right of the keyword. This constraint may be established in terms of the bounding rectangles of the input symbols (e.g. the bounding rectangle of the input symbol must be to the right of the bounding rectangle for the keyword). However, other types of constraints are possible. As mentioned above, constraints may also be used to impose an order of parsing based on the relevance measure of keywords.

Further associated with each rule is an action. The action part of a rule encodes an action that is taken when the rule is matched. Such an action can be encoded as a function or as a procedure. One example of an action would be to create a particular keyword if a rule does not match. A second example would be to cause evaluate a matched subexpression. Nevertheless, the action part of a rule may be empty, i.e. no action is taken when the rule is matched.

At this point, it useful to review the differences between attribute grammars and constrained grammars. Observe that a production rule in a constrained grammar has a syntactic and a semantic part as it does in an attribute grammar. However, a constrained attribute grammar, incorporates into a production rule, constraints and actions. A constraint associates input symbols (i.e. subpatterns) to terminal and nonterminal symbols. It is the constraints which provide for the definition of spatial relationships between the subpatterns. Also, in a constrained attribute grammar a division of the terminal symbols into keywords and non-keywords is provided. Finally, a constrained attribute grammar provides for further distinguishing keywords by providing for definition of a relevance measure for each keyword.

Example of a Constrained Attribute Grammar

Using the above definition, an instance of a constrained attribute grammar for recognizing mathematical expressions is provided. Such a grammar would be useful in applications such as the recognition of mathematical expressions written on a graphical tablet. In order to simplify the example, it is assumed that the language defines two operators, addition (+) and division (−), and that each character in an exemplary expression of the language has been determined to be a valid.

In this case, the language has the keyword "+" for addition, and the keyword "−" for division. The symbol "nk" denotes a non-keyword. The nonterminals are S, E, $E_1$, and $E_2$, where S is the start symbol. The attribute values of a terminal symbol are the corner points of the bounding rectangle of a corresponding subpattern. The attribute values of a nonterminal symbol are the corner points of the minimum bounding rectangle that encloses all the corresponding subpatterns of terminal symbols which comprise the nonterminal symbol (recall that the minimum bounding rectangle for a nonterminal is simply a union of the bounding rectangles of the terminal symbols which comprise the nonterminal). So, for any terminal or nonterminal symbol x, A (x) denotes the values of the corner points of a bounding rectangle. The relevance measure M of a keyword is computed as the width of its boundary box. Here, M(+) = 32 and M(−) = 60.

The production rules for the grammar are described in Table A. In the constraint part of each rule, the symbol x indicates a terminal or a nonterminal symbol, while the symbol k indicates a keyword symbol. It should be noted that the production rules for this grammar have no actions.

TABLE A

| | PRODUCTION RULES | |
| --- | --- | --- |
| Syntactic Part | Semantic Part | Constraints |
| 1. S → E\|nk | A(S) = A(E) \|A(nk) | $C_1$ (x) = true. |
| 2. E → +$E_1$ $E_2$ | A(E) = A(+) ∪A(E1) ∪A(E2) | $C_0$ (x) = Eq (x,+) and M (x) ≧ M (k), for all k. If more than one x satisfies C0, choose one arbitrarily. |

TABLE A-continued

| | PRODUCTION RULES | | |
|---|---|---|---|
| | Syntactic Part | Semantic Part | Constraints |
| 3. | $E \rightarrow -E_1 E_2$ | $A(E) = A(-) \cup A(E_1) \cup A(E_2)$ | $C_1(x) = \text{West}(x,+)$. $C_2(x) = \text{East}(x,+)$. $C_0(x) = \text{Eq}(x,-)$, and $M(x) \geq M(k)$, for all k. If more than one x satisfies C0, choose one arbitrarily. $C_1(x) = \text{North}(x,-)$. $C_2(x) = \text{South}(x,-)$. |
| 4. | $E_1 \rightarrow E\|nk$ | $A(E_1) = A(E) \| A(nk)$ | $C_1(x) = \text{true}$. |
| 5. | $E_2 \rightarrow E\|nk$ | $A(E_1) = A(E) \| A(nk)$ | $C_1(x) = \text{true}$. |

To establish a correspondence between constraints and input symbols, note that the symbols on the right hand side of each rule are implicitly numbered 0, 1, and so on. For instance in rule 2, every input symbol that satisfies the constraint $C_1$ is in correspondence with the symbol $E_1$.

The symbols utilized in the production rules would be familiar to one skilled in the art, but definitions thereof are provided here to aid in the understanding. The symbol "→" can be read as "produces". The symbol "|" can be read as "or". The symbol "∪" can be read "union with". Finally, the symbol "ε" can be read as "is an element of". It should be noted that spatial constraints, e.g. North, South, East and West are predefined functional primitives. Such functional primitives compare the bounding rectangles for symbols to determine if a predetermined spatial criteria is satisfied. It would be apparent to include other such spatial constrains, e.g. diagonals for matrix operations, to satisfy any spatial requirements for a particular language implementation.

With respect to rule 1, the syntactic part means that the start symbol S will produce the nonterminal E or the non-keyword nk. The non-keyword here would be a character or a number as defined in the language alphabet. The semantic part means that the attribute, i.e. the bounding rectangle, of the start symbol would equal the attribute of the nonterminal or non-keyword. The constraint portion indicates that any symbol satisfies the rule.

With respect to rule 2, the syntactic part means that the nonterminal E will produce a "+" keyword associated with a first nonterminal ($E_1$) and a second nonterminal ($E_2$). It should be noted that this syntactic part does not indicate a spatial relationship between the two nonterminals, only that two expressions must be associated with the keyword. The semantic part means that the bounding rectangle for the nonterminal E is equal to the union of the bounding rectangles of the "+" keyword and nonterminals $E_1$ and $E_2$. The constraints part provides the necessary spatial relationships. The constraint $C_0$ requires that the input symbol be the keyword "+" and that the relevance measure of the keyword "+" be greater than or equal to the relevance measure of all keywords not yet processed. If several "+" keywords have the same relevance measure, one of them is chosen arbitrarily. The constraint $C_0$ provides a means by which the parsing of keywords may be ordered. The constraint $C_1$ selects any terminal or nonterminal symbol that is to the west of the "+" keyword. The constraint $C_2$ selects any terminal or nonterminal symbol that is to the east of the "+" keyword.

With respect to rule 3, the syntactic part means that the nonterminal E will produce a "−" keyword associated with a first nonterminal ($E_1$) and a second nonterminal ($E_2$). It should be noted that this syntactic part does not indicate a spatial relationship between the two nonterminals, only that two expressions must be associated with the keyword. The semantic part means that the bounding rectangle for the nonterminal E must be equal to the union of the bounding rectangles of the "−" keyword and non terminals $E_1$ and $E_2$. The constraint part provides the necessary spatial relationships. As with rule 2, the constraint $C_0$ requires that the input symbol be the keyword "−" and that relevance measure of the keyword "−" be greater than or equal to the relevance measure of all keywords not yet processed. If several "−" keywords have the same relevance measure, one of them is chosen arbitrarily. The constraint $C_1$ selects any terminal or nonterminal symbol that is to the north of the "−" keyword. The constraint $C_2$ selects any terminal or nonterminal symbol that is to the south of the "−" keyword.

The syntactic part of rule 4 means that the nonterminal $E_1$ will produce the nonterminal E or the non-keyword nk. The semantic part means that the bounding rectangle for the nonterminal $E_1$ will equal the bounding rectangle for the nonterminal E or the non-keyword. The constraint portion indicates that any symbol satisfies the constraint.

The rule 5 is identical to rule 4 except that the nonterminal $E_2$ is under consideration. The operation of all the production rules will become more apparent in the description of a Parser process described below.

Implementation Details of the Example Language

In an implementation of a constrained attribute grammar, the terminal symbols represent the alphabet of the language. The alphabet is a set of predetermined symbols. The implementation would include functions for identifying keywords and non-keywords, and a function for associating a keyword with a production rule. For instance, the function for determining if a character is a keyword symbol may be implemented as follows. A character c is provided as the input parameter to the function. Then, the function returns the value TRUE if c is a keyword in the language, otherwise it returns the value FALSE. A similar implementation may be given for the function that determines if a symbol is a non-keyword in the language. TABLE B illustrates the functions for identifying keywords, non-keywords and for associating a keyword with a production rule, in the C programming language for the exemplary language described in the previous section.

TABLE B

```
1. Boolean IsKeyw (c)
2. char c;
3. {
4.   return ( c == '+' || c == '-' );
5. }
```

TABLE B-continued

```
6.  SymbolKind     GetKeywKind (c)
7.  char      c;
8.  {
9.  switch (c) {
10.         case '+':
11.             return (addop)'
12.         case'':
13.             return (divline);
14.         default:
15.             DebugStr(" pGetKeywKind: unkown symbol");
16.         }
17.
18. }
19. Boolen IsNonKeyw(c)
20. char    c;
21. {
22. return(('0' <= c && c <= '9') || ('a' <= c && c <= 'z')
23.                                || 'A' <= c && c <= 'Z'));
24. }
```

A first function IsKEYW, lines 1-5, receives a character and determines whether it is a keyword defined within the language. In this instance the set of keywords are the symbols +, −.

A second GetKeywKind, lines 6-18, evaluates a provided character to determine what type of keyword it is. Such an evaluation is necessary for later identification of rules associated with the keyword. For example, lines 10-11 check for the case of a '+' character and associate a production rule called addop to the '+' character. Each of the keywords is associated with a character string that identifies a production rule. Finally, lines 14-15 provide a default error message if a non-keyword is provided as input.

A third function IsNonKeyw, lines 19-24 identifies a character as being a nonkeyword. In this instance the set of nonkeywords are the digits "0" through "9", the characters "a" through "z", and the characters "A" through "Z".

Table C illustrates the definition of a production rule. In this case, the production rule is associated with the '+' keyword. Here it is presumed that the keyword symbol '+' will have been associated to the character string "addop" in the manner described above.

TABLE C

```
1.  rule = NewObject (rule Kind, "\psexpression", &r);
2.  AddRule (rule, rules, addop, sexpression, UNDEFINED,
3.          UNDEFINED);
4.  symbol = NewObject (symbKind, "\paddop", &r);
5.  AddSymbolToRule (symbol, rule, addop, UNDEFINED, UNDEFINED,
6.          UNDEFINED, 1);
7.  symbol = NewObject (symbKind, "\psexpression", &r)'
8.  AddSymbolToRule (symbol, rule, sexpression, cWEST, WEST, 0, 2);
9.  symbol = NewObject (symbKind, "\pterm", &r);
10. AddSymbolToRule (symbol, rule, term, cEAST, EAST, 0, 3);
```

There are two primary functions that are use in the definition of a production rule; AddRule and AddSymbolToRule. The AddRule function is the means by which a rule is added to a set of rules. The AddRule function has the following syntactic:

AddRule(r,R,k,lhs,$a_1$,$a_2$)

where r is the rule being processed, R is a set of rules for the grammar, k is the keyword, lhs is the left hand side symbol and $a_1$ and $a_2$ are actions that may be taken when the rule is matched.

The AddSymbolToRule function is the means by which a symbol is added to the rule. In this instance a symbol is either a keyword, non-keyword or nonterminal. The AddSymbolToRule function has the following syntactic:

AddSymbolToRle(s,r,n,c,d,q,m)

where s the symbol, r is the rule being processed, n is the symbol name, c is the name of the constraint function associated with the symbol, d is the name of the display procedure for the symbol, if the rule has a keyword, q is equal to the keyword symbol number, if the rule does not have a keyword, q is set to −1, and m is the symbol number for the symbol being processed. It is important to note that there will typically be a plurality of symbols associated with a rule.

Referring to Table C, using the rule grammar notation described above, a rule of the following form is created:

Sexpression→addop Sexpression Term

Note that the Sexpression symbol on the left hand side of the rule was defined by the AddRule function while the addop, Sexpression and Term symbols on the right hand side of the rule were defined by the AddSymbolToRule function.

Referring to lines 2-3 of TABLE C, the AddRule function defines the addop keyword to be associated with the rule and a left hand side symbol Sexpression. Here the notations UNDEFINED indicate that there is no action that would be taken upon the matching of this rule.

Referring to lines 4-6 of TABLE C, the AddSymbolToRule function defines keyword symbol addop on the right hand side of the rule. The keyword symbol addop has no spatial constraints and has been assigned the symbol number 1.

Referring to lines 7-8 of Table C, the AddSymbolToRule function defines the symbol Sexpression on the right hand side of the rule with a constraint that it be to the west of the symbol number 1, i.e. the addop keyword symbol. This symbol has been assigned the symbol number 2.

Referring to lines 9-10 or TABLE C, the AddSymbolToRule function defines the symbol Term on the right hand side of the rule with a constraint that it be to the east of the symbol number 1, i.e. the addop keyword symbol. This symbol has been assigned the symbol number 3.

With regards to the spatial constraints included in the production rules, comparisons are made based on the bounding rectangles associated with each symbol (as defined by the semantic part of the rule). Such a constraint is illustrated in TABLE D.

TABLE D

```
1. Boolean cEAST (dist, r1, r2)
2. int      *dist;
```

TABLE D-continued

```
3.  Rect    *r1;
4.  Rect    *r2;
5.  {
6.  int     midx, midy;
7.  Boolean east;
8.  if (RectHeight (*r1) < RectHeight (*r2)){
9.      midx = (r1->right + r1->left) >> 1;
10.     midy = (r1->top + r1->bottom) >> 1;
11.     east = (r2->top <= midy) && (midy <= r2->bottom)
12.                             && (midx <= r2->right);
13.     *dist = r2->right - midx;
14. }
15. else {
16.     midx = (r2->right + r2->left) >> 1;
17.     midy = (r2->top + r2->bottom) >> 1;
18.     east = (r1->top <= midy) && (midy <= r1->bottom)
19.                             && (r1->right <= midx);
20.     *dist = midx - r1->right;
21. }
21. return (east)
22. }
```

TABLE D illustrates a C-Language implementation for an "East" of constraint. The function returns two values; a Boolean value indicating whether or not a second rectangle (i.e. r2) is to the east of a first rectangle (i.e. r1), and the east-oriented distance between the two rectangles. If the second rectangle (r2) is not to the east of the first rectangle (r1), an invalid distance is returned. It should be noted that the Y-coordinate increases from top to bottom ad the X-coordinates increases from left to right.

The flow of operation for the cEAST constraint is similar to that used for all constraints in this language. Processing is first premised on which rectangle has a greater height. Line 8 of Table D is a conditional statement which dictates processing control. If the height of r1 is less than r2, then the midpoints of r1 are determined (lines 9–10). A true value is returned, i.e. r2 is east of r1, if the Y-coordinate of the upper left point of r2 is less than or equal to the midpoint Y-coordinate of r1 and the midpoint Y-coordinate is less than or equal to the Y-coordinate of the lower right point of r2 and the X-coordinate of the lower right point of r2 is less than or equal to the X-coordinate of the midpoint of r1 (see lines 11–12). Otherwise, a false value is returned. The distance returned is the value resulting when subtracting the X-coordinate of the midpoint of r1 from the X-coordinate of the lower right point of r2 (see line 13).

If the height of r1 is greater than or equal to the height of r2, then the midpoint of r2 is determined (lines 16–17). A true value is returned, i.e. r1 is east of r2, if the Y-coordinate of the upper left point of r1 is less than or equal to the midpoint Y-coordinate of r2 and the midpoint Y-coordinate is less than or equal to the Y-coordinate of the lower right point of r1 and the X-coordinate of the lower right point of r1 is less than or equal to the X-coordinate of the midpoint of r2 (see lines 18–19). Otherwise, a false value is returned. The distance returned is the value resulting when subtracting the X-coordinate of the midpoint of r2 and the X-coordinate of the lower right point of r2 (see line 20).

Parsing Method of the Preferred Embodiment

The parsing method of the preferred embodiment produces a parsed tree from a set of input subpatterns and a constrained attribute grammar, if the input subpatterns constitute a valid pattern as defined by the grammar. If the input does not define a pattern in the language, the parsing method returns an error message. The method of the preferred embodiment utilizes recursive programming techniques. It should be noted that the parsing method of the preferred embodiment uses heuristics to limit the parsing process. In the description of the method of the preferred embodiment, a means for backtracking is provided. Such a backtracking means would be useful in situations where after attempting to parse a rule further parsing is not possible. Using such backtracking means, all possible meaningful parsable combination could be derived.

Figure 4A:
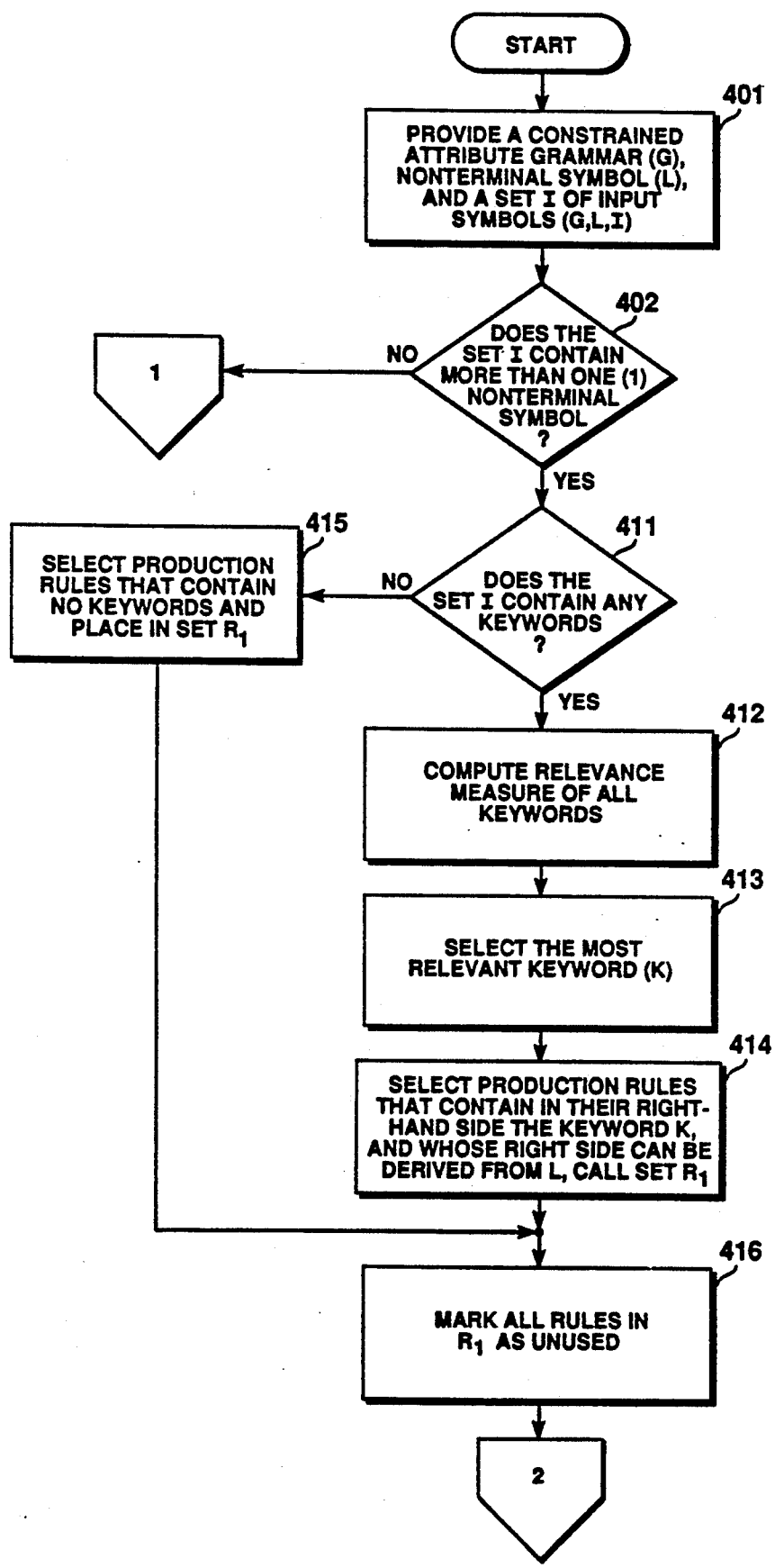
FIGS. 4a-4d are flowcharts illustrating the general steps for parsing as may be utilized in the preferred embodiment of the present invention.

The parsing method of the preferred embodiment is illustrated in FIGS. 4a–4d. Referring to FIG. 4a, the method of the preferred embodiment has as input parameters an instance of a constrained attribute grammar G, a nonterminal symbol L, and a non empty set of input symbols I, step 401. The set I is modified during the processing of the method. The parsing method is implemented as a function which returns a "success" value if the elements in the set of input symbols I can be rewritten as the nonterminal symbol L using the grammar G. If not, the function returns "failure". For the initial call the symbol L is the start symbol S and I is the initial set of input symbols (i.e. the subpatterns) received from a character recognition system. Notation is used for the invocation of the function will be Parse (G, L, I). Recursive invocations will typically provide different values of L and I. So the notation for the first call of the function will be Parse (G, S, I).

Figure 4B:
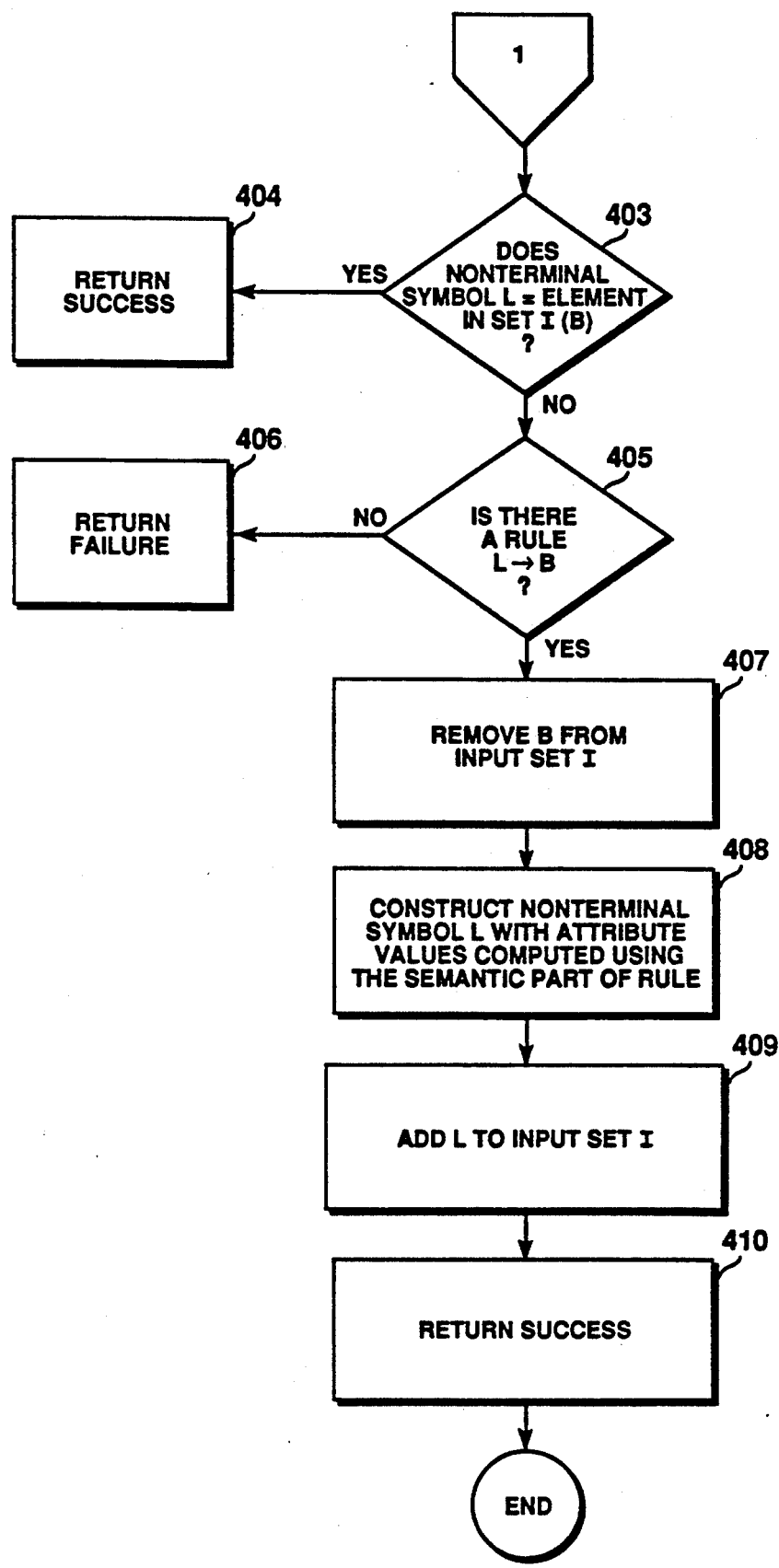

It must then be determined if the set I contains more than one element, step 402. Referring now to FIG. 4b, if the set I contains one element symbol, then one of three cases arise. First, it is determined if the symbol L has the same type as the element in the input set I, step 403. If they have the same type, a success value is returned, step 404. If L does not have the same syntactic kind as the element in the input set I, L must be a nonterminal symbol. It is then determined if there is a production rule such that the nonterminal symbol produces the element in input set I, step 405. This is accomplished by examining the syntactic portion of the production rules to locate the element in the input set I as being on the right hand side of the rule and the nonterminal symbol as being on the left hand side of the rule. If no production rule produces the element, the method returns a "failure" value, step 406. This means that an invalid subpattern has been found in the pattern and thus the pattern is not valid according to the language. If such a production rule does exist, the nonterminal symbol is removed from the set I, step 407. Next, an intermediate nonterminal symbol labelled L is created with values computed using the production rule identified in step 405, step 408. The nonterminal symbol L is then added to the set I, step 409. A "success" value for the invocation of the function is then returned, step 410. It should be noted that the steps 403-410 checks for valid subpatterns.

Referring back to FIG. 4a, if there is more than one element in the input set I, then it must be determined which symbol in the input set I is to be processed. It is first determined if the input set I contains any keywords, step 611. If yes, the relevance measure M of eachkeyword in the input set I is computed, step 412. Next, the most relevant keyword, i.e. the keyword with the highest relevance measure, is selected, step 413. Production rules which contain the keyword K in their right hand side and whose left hand side can be derived from L are collected in a set called $R_1$, step 414. All the production rules in $R_1$ are then marked as unused, step 416.

Alternatively, if the set I does not contain any keywords, the set of production rules that do not contain any keywords and whose left hand side can be derived from L is placed in set $R_1$, step 415. Again, all the production rules in $R_1$ would then be marked as unused per step 416.

Figure 4C:
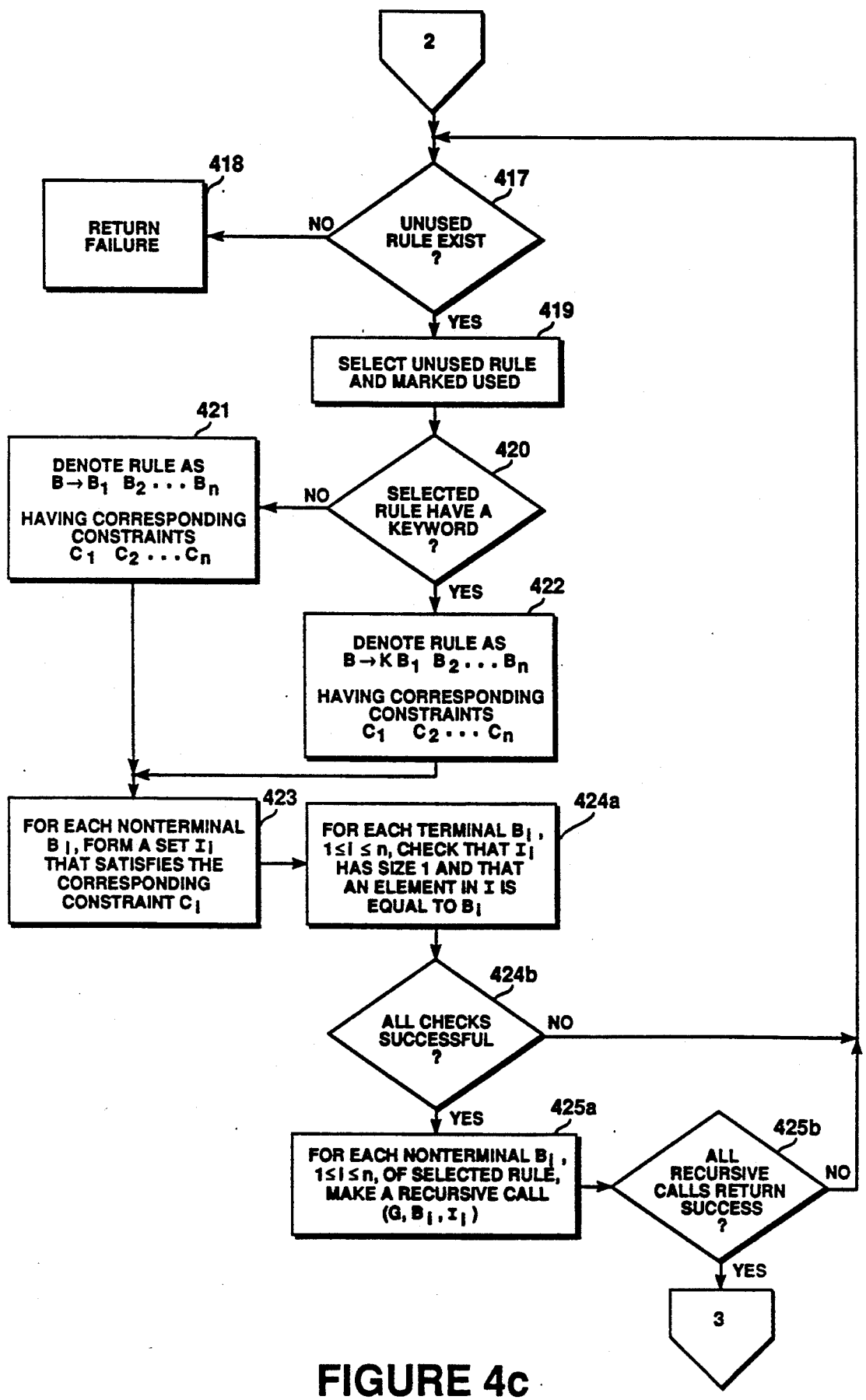

Referring not to FIG. 4c, it is then determined if there is an unused production rule, step 417. If not unused rule exists, return a failure value, step 418. If an unused rule exists in $R_1$, select an unused rule and mark it as used, step 419. It is then determined if the selected rule has a keyword step 420. If the selected rule does not have a keyword, the rule has the form $B \rightarrow B_1 B_2 \ldots B_n$ and the symbols have the corresponding constraints $C_1 C_2 \ldots C_n$, step 413. Otherwise, the rule has the form $B \rightarrow K B_2 \ldots B_n$ and the symbols have the corresponding constraints $C_1 C_2 \ldots C_n$, step 422.

For each symbol $B_i$ of the selected rule form a set $I_i$ of elements in I that satisfy the constraint $C_i$ of the identified rule, step 423. For each terminal symbol $B_i$, if the set $I_i$ contains a single element and the type of the element is equal to $B_i$ then mark the match "success", otherwise mark the match "failure", step 424a. The result of each of the checks of terminal symbols $B_i$ is determined, step 424b. If not all the matches are successful, i.e. one of the matches is marked with the "failure" value then a check for an unused rule is made per step 417 and the method continues as described above.

If every terminal symbols in the rule has a successful match, a recursive call is then made for each nonterminal symbol $B_i$, step 425a (e.g. Parse (G, $B_i$, $I_i$)). The result of each call is then determined, step 425b. If not all the calls are successful, i.e. one of the recursive calls returns a "failure" value then a check for an unused rule is made per step 417 and the method continues as described above.

Figure 4D:
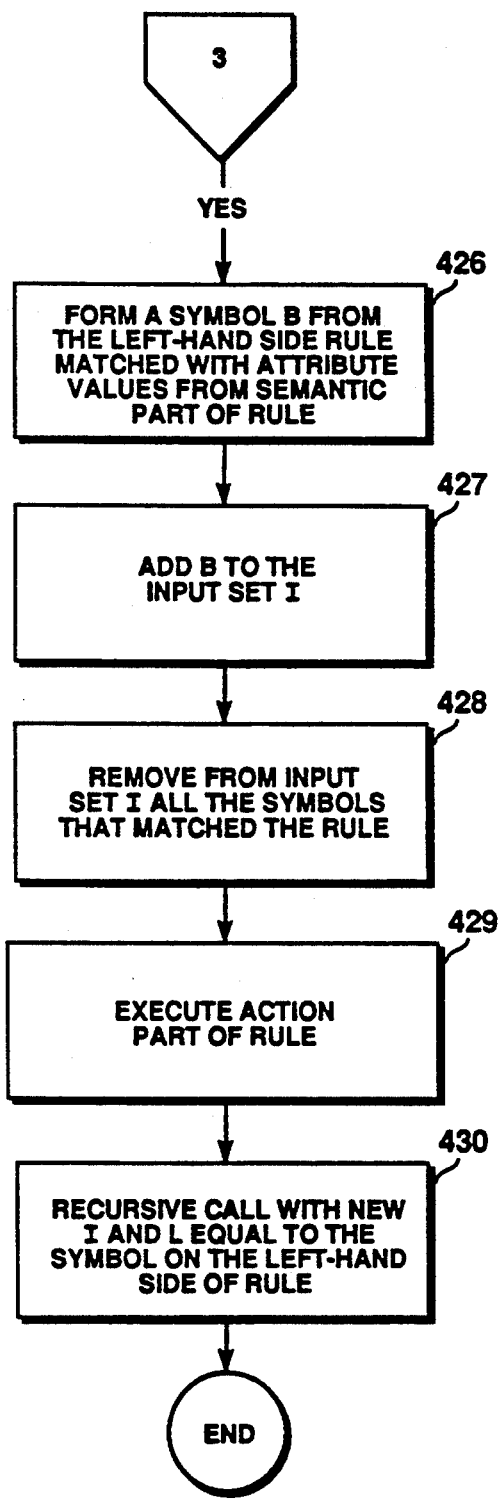

Referring now to FIG. 4d, if all the recursive calls do return "success" then a new nonterminal symbol B is created from the left hand side of the syntactic part of the production rule used and the attribute values are provided from the semantic part of the production rule, step 426. The new nonterminal symbol B is then added to the input set I, step 427. Next, all the symbols that matched the rule are removed from the input set I, step 428. The action part, if any, associated with the rule is then executed, step 429. Finally, a recursive call with the modified input set I and the symbol L (e.g. Parse G, S, I), step 430.

In order for the initial call to the Parser function to return a "success"0 value, all invocations of the Parser function must have returned a "success" value. If at any point a "failure" value is returned, the value of the initial call will be "failure".

It should be noted that the Parsing method of the preferred embodiment is general in nature. Namely, there are not restrictions on the existence of keywords in the rules. Further it should be noted that the provision of error messages has not been Described. It would be apparent to one skilled in the art to return error messages at points in the method where a failure value is returned.

Operation of the parsing method of the preferred embodiment is described in greater detail with respect to the example of the mathematical language described above. Consider the following mathematical equation:

$$\frac{3}{4}+1$$

The output of the character recognition processes would provide the initial input set $(+,-,3,4,1)$. In an initial call, the nonterminal symbol is the starting symbol S and the input set. Thus, the grammar G=Mathematical Expressions Example, L=the start symbol S and I=$(+,-,3,4,1)$. Using the notation described above, the initial call would be Parse (G,S,I). It should be noted that each number in the set I is a terminal symbol (nk). However, for clarity in the exposition, we refer to the numbers instead of referring to their type.

Since the initial input set has more than one element, it is determined if any keywords exist in input set I. The keywords "+" and "−" exist in the input set I. Relevance measures for each keyword are then computed. The relevance measure for each is $M(+)=32$ and $M(-)=60$. Thus, the most relevant keyword is "−" (division symbol). Upon examining the production rules for the keyword "−", it is found that only one such rule exists. The production rule for the keyword "−" is given below.

The symbol x in the constraint part of the rule denotes a nonterminal or a terminal symbol, while the symbol k denotes a keyword symbol.

$E \rightarrow -E_1 E_2 \quad A(E) = A(-) \cup A(E_1) \cup A(E_2)$
$C_0(x) = Eq(x,-),$
and $M(x) \geq M(k).$
$C_1(x) = North(x,-).$
$C_2(x) = South(x,-).$ The rule is then placed in a set $R_1$, marked unused, selected and marked as used. A subset of symbols from I, which satisfies the corresponding constraints, is created for each of the nonterminal symbols $E_1$ and $E_2$. These subsets are called $I_1$ and $I_2$, respectively. The subset $I_1=(3)$ since the non-keyword 3 satisfies $C_1$ and the subset $I_2=(4)$ since the non-keyword satisfies $C_2$. Recursive calls are then made with symbols $E_1$ and $E_2$ and their corresponding subsets, i.e. Parse (G, $E_1$, $I_1$) and Parse (G, $E_2$, $I_2$).

Evaluating the recursive call Parse (G, $E_1$, $I_1$), it is determined that the input set only contains one element, i.e. (3). The nonterminal symbol $E_1$ does not have the same type as the element in $I_1$, but a production rule which produces the element is rule 4 $E_1 \rightarrow$Elnk (recall that the number 3 is an non-keyword). Thus, the element in the input set $I_1$ can be replaced by the nonterminal symbol $E_1$. Note that the semantic part of rule 4 provides that $A(E_1)=A(3)$. The element 3 is removed from the input set $I_1$ while the intermediate symbol $E_1$, used in the recursive call, is added to the set. Hence, $I_1=\{E_1\}$. This invocation of the function then returns a "success" value.

Evaluating the recursive call Parse (G, $E_2$, $I_2$), it is determined that the input set only contains one element, i.e. (4). The nonterminal symbol $E_2$ does not have the same type as the element in $I_2$, but a production rule which produdes the element is rule 5 $E_2 \rightarrow$Elnk (recall that the number 4 is an non-keyword). Thus, the input set $I_2$ can be written as the nonterminal symbol $E_2$. Note that the semantic part of rule 5 provides that $A(E_2)=A(4)$. Thus, the element 4 is removed from the input set $I_2$ while the intermediate symbol $E_2$, used in the recursive call, is added to the set. Hence, $I_2=\{E_2\}$. This invocation of the function then returns a "success" value.

As both recursively called functions have returned "success", a new nonterminal symbol E is created and added to the input set I. E is from the left hand side of the syntactic part of rule 3. Further, the attribute value for the nonterminal E is derived from the semantic part of the rule. So $A(E) = A(-) \cup A(3) \uparrow A(4)$. The symbols matched in the rule are removed from the input set I, and the left hand side nonterminal symbol is added so that $I = (E, +, 1)$. Effectively, the subpattern $$\frac{3}{4}$$

has been rewritten as E. There is no action part in this rule. A recursive call Parse (G, S, I) is then made.

During this recursive call, there is again more than one element in the input set, and the keyword "+" is the most relevant (and only) keyword. Upon examining the production rules for the keyword "+" it is found that only one such keyword exists. The production rule for the "+" keyword is given below. The symbol x in the constraint part of the rule denotes a nonterminal or a terminal symbol, while the symbol k denotes a keyword symbol.

| |
|---|
| $E \rightarrow +E_1 E_2$  $A(E) = A(+) \cup A(E_1) \cup A(E_2)$ |
| $C_0(x) = Eq(x, +)$ and $M(x) \geq M(k)$. |
| $C_1(x) = West(x, +)$. |
| $C_2(x) = East(x, +)$. |

The rule is then inserted into set $R_1$, marked unused, selected and marked as used. As was done above, a subset of symbols from I, which satisfies the corresponding constraints, is created for each of the symbols $E_1$ and $E_2$. These subsets are called $I_1$ and $I_2$, respectively. The subset $I_1 = \{E\}$ since the nonterminal E satisfies $C_1$ and the subset $I_2 = \{1\}$ since the non-keyword 1 satisfies $C_2$. Recursive calls are then made with symbols $E_1$ and $E_2$ and their corresponding subsets, i.e. Parse (G, $E_1$, $I_1$) and Parse (G, $E_2$, $I_2$).

Evaluating the recursive call Parse (G, $E_1$, $I_1$), it is determined that the input set only contains one element, i.e. (E). The nonterminal symbol $E_1$ does not have the same type as E but a production rule which produces the element is rule 4 $E_1 \rightarrow$ Elnk. Thus, the element in the set $I_1$ is replaced by the nonterminal symbol $E_1$. Note that the semantic part of rule 4 provides that $A(E_1) = A(E)$. Thus, the element E is removed from the input set $I_1$ and the intermediate symbol $E_1$, used in the recursive call, is added to the set. Hence, $I_1 = \{E_1\}$. The function then returns a "success" value.

Evaluating the recursive call Parse (G, $E_2$, $I_2$), it is determined that the input set only contains on element, i.e. (1). The nonterminal symbol $E_2$ does not have the same type as 1 but a production rule which produces the element is rule 5 $E_2 \rightarrow$ Elnk (recall that the number 1 is a non-keyword). Thus, the input set $I_2$ can be rewritten as the nonterminal symbol $E_2$. Note that the semantic part of the rule 5 provides that $A(E_2) = A(1)$. Thus, the element 1 is removed from the input set $I_2$ and is replaced with intermediate symbol $E_2$ used in the recursive call. Hence, $I_2 = \{E_2\}$. The recursively called function then returns "success".

As both recursively called functions have returned "success", a new nonterminal symbol E is created and added to the input set I. E is from the left hand side of the "+" keyword syntactic rule 2. The symbols matched in the rule, including the "old" E, are removed from the input set I, so that $I = (E)$. Further, the attribute value for the nonterminal E is derived from the semantic part of the rule. So $A(E) = A(1) \cup A(\text{"old"} E) \cup A(1)$. Here the expression $E + 1$ has been rewritten as E. The rule has not action part. Another recursive call Parse (G, S, I) is then made.

In this recursive call, there is only one element in the input set I, namely E. This nonterminal is not equal to S but a production rule which produces the element is rule 1 $S \rightarrow$ Elnk. Thus, the element in the set I is replaced by the nonterminal symbol S. Note that the semantic part of the rule 1 provides that $A(S) = A(E)$. This recursive invocation of the function then returns a "success" value.

The returned "success" values then propagate back-up so that the initial invocation provides a success so that the input set I is re-written as the start symbol S and the pattern is deemed valid.

Figure 5:
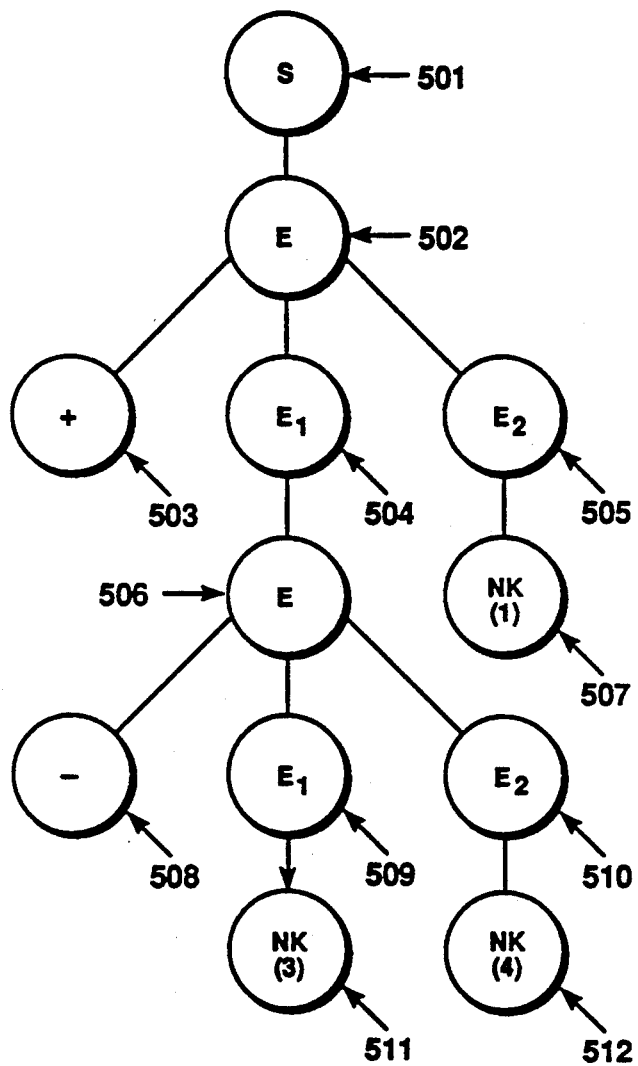
FIG. 5 illustrates a parse tree example as may be generated during the parsing by the preferred embodiment of the present invention.

The tree structure that is generated as a result of the parsing is illustrated in FIG. 5. In FIG. 5, the start symbol 501 is the root node. A nonterminal symbol E 502 corresponds to the Parsing of the "+" keyword. The nonterminal E 502 is further broken down into component nonterminal $E_1$ 504, $E_4$ 505 and the "+" keyword 503. The nonterminals 504 and 505 are further parsed into nonterminal E 506 and non-keyword "1" 507, respectively. The nonterminal E 506 is Parsed into the "−" keyword 508 and nonterminals $E_1$ 309 and $E_2$ 510. Finally, non-keyword "3" 511 corresponds to nonterminal $E_1$ 509 and non-keyword "4" 512 corresponds to nonterminal $E_2$ 510.

Thus, a method for defining and identifying valid patterns in a pattern recognition system is described.

I claim:

1. In a pattern recognition system, a method for determining that a pattern is invalid according to a predetermined grammar, said pattern comprised of a plurality of terminal subpatterns, said terminal subpatterns representing characters in a language implemented in said grammar, said method comprising the steps of:

a) generating and storing a language implementation of a predetermined grammar, said predetermined grammar having a plurality of production rules, each of said plurality of production rules including a plurality of nonterminal symbols each capable of having a corresponding constraint for defining multi-dimensional spatial relationships between symbols;

b) receiving and storing an input set of symbols, said set of symbols representing subpatterns of a pattern to be recognized according to said language, each of said symbols having a spatial attribute for identifying a spatial placement of said subpattern;

c) identifying a production rule associated with said input set of symbols;

d) comparing spatial attributes of nonterminal symbols of said identified production rules to spatial attributes of symbols in said input set of symbols according to a corresponding constraint of said identified production rule;

e) determining that no symbols in said input set of symbols satisfy said constraints part of said identified production rule; and f) returning a signal identifying said pattern as invalid.

2. The method as recited in claim 1 wherein said step of comparing spatial attributes of nonterminal symbols of said identified production rules to spatial attributes of symbols in said input set of symbols according to a corresponding constraint is further comprised of the steps of:

g) retrieving the spatial attribute of a nonterminal symbol for said identified production rule, said nonterminal symbol having at least one corresponding constraint;

h) comparing spatial attributes of each symbol in said input set of symbols with said spatial attributes of a nonterminal symbol for said identified production rule according to said corresponding constraint; and i) repeating steps g) and h) for each nonterminal symbol in said production rule.

3. The method as recited in claim 2 wherein said step of identifying a production rule associated with said input set of symbols is further comprised of the steps of:

j) determining if any of said input set of symbols contains a keyword;

k) if a keyword is in said input set of symbols:
computing a relevance measure for each keyword;
selecting a production rule associated with the keyword having the highest relevance measure; and l) if a keyword is not in said input set of symbols, selecting any of said production rules that is not associated with keyword.

4. In a pattern recognition system coupled to a scanning means, said scanning means for providing a pattern in the form of a plurality of subpatterns, said pattern recognition system for identifying a pattern as being valid according to a language implementation of a predetermined grammar, said predetermined grammar including a plurality of production rules for defining construction of valid patterns, an improvement to said pattern recognition system, said improvement for recognizing invalid pattern, said improvement comprising:

a receiving means for receiving and storing each of said plurality of subpatterns, each of said plurality of subpatterns including a spatial attribute;

rule storage means of storing production rules for parsing said plurality of subpatterns, said production rules further including means for defining multi-dimensional spatial relationship between subpatterns;

parsing means coupled to said rule storage means, said parsing means for parsing said input subpatterns according to said production rules to identify invalid patterns, said parsing means further comprised of:

means for identifying a production rule for a set of input subpatterns;

means for determining a spatial relationship between a first subpattern and a second subpattern from said set of input subpatterns;

means for identifying a pattern as invalid if said first subpattern and said second subpattern do not have said multi-dimensional spatial relationship of said identified production rule.

\* \* \* \* \*